United States Patent [19]
Meletti et al.

[11] 3,813,501
[45] May 28, 1974

[54] ELECTRICAL CORD-REEL APPARATUS

[75] Inventors: Adolph Meletti; Bernard J. Tamarin, both of Philadelphia, Pa.

[73] Assignee: Vacuum Cleaner Corporation of America, Philadelphia, Pa.

[22] Filed: Apr. 6, 1972

[21] Appl. No.: 241,641

[52] U.S. Cl............................................. 191/12.2 R
[51] Int. Cl............................................. H02g 11/00
[58] Field of Search...................... 191/12.2 R, 12.4; 242/107.7

[56] References Cited
UNITED STATES PATENTS

| | | | |
|---|---|---|---|
| 3,137,883 | 6/1964 | Descarries | 191/12.2 R |
| 3,528,624 | 9/1970 | Tamarin | 242/107.7 |
| 3,542,172 | 11/1970 | Meletti | 191/12.2 R |
| 3,617,659 | 11/1971 | Freeman | 191/12.2 R |

Primary Examiner—M. Henson Wood, Jr.
Assistant Examiner—D. W. Keen
Attorney, Agent, or Firm—Charles A. McClure

[57] ABSTRACT

Retractable electrical cord-reel apparatus is provided with a pair of hub-and-flange members secured together in sheave-like configuration to accommodate an electrical cord wrapped therearound. The ends of a pair of electrical conductors in the cord terminate within the hub after passage through a gap therein and are secured against lengthwise withdrawal by frictional engagement in serpentine configuration about a plurality of bosses upstanding on the back of one of the hub-and-flange members whose opposite face carries ringlike electrical conductors communicating with the ends of the cord conductors via intervening openings through the member.

20 Claims, 6 Drawing Figures

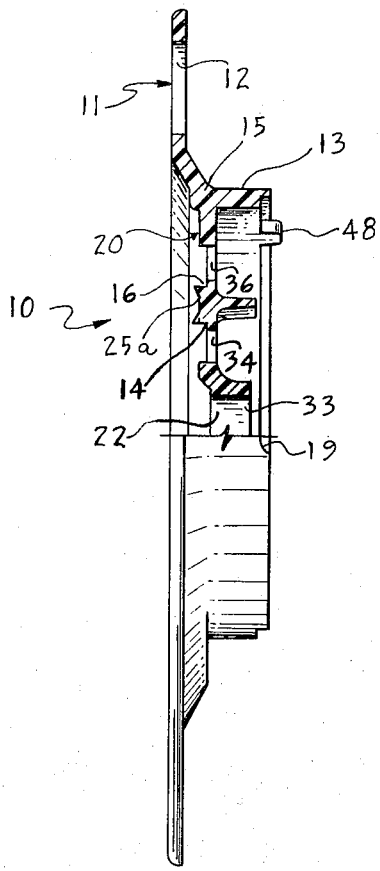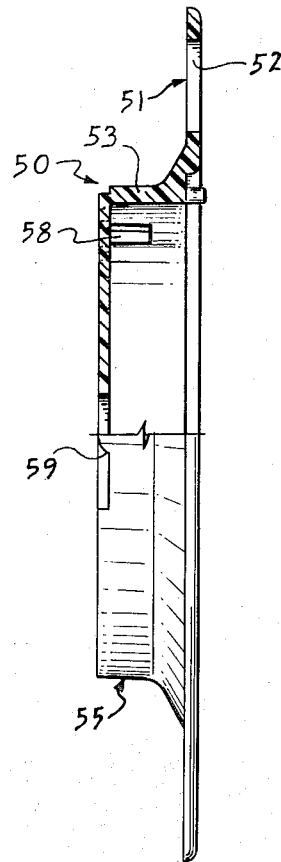
FIG 1.
FIG 2.

ELECTRICAL CORD-REEL APPARATUS

This invention relates to retractable electrical cord-reels such as have a spring motor therein and optionally have latching and unlatching mechanism for controlling paid-out length and retraction of the cord, especially such reels having hub-and-flange members made of synthetic resin material.

Reference is made to Meletti U.S. Pat. No. 3,542,172 for a cord-reel of this general type. The cord-reel of the present invention is modeled thereon but differs therefrom and is an improvement thereover in certain important respects described below. To the extent that the respective reels are alike, rather than different as described herein, the description in that patent is incorporated herein (by this reference) for disclosure of the features common to both. Similarly incorporated herein are the disclosures of magnetic latching and unlatching mechanisms in Tamarin U.S. Pats. Nos. 3,528,624 and 3,596,849 and of a protective and electrically insulating dust cover of Tamarin U.S. Pat. No. 3,489,866. The present invention is useful, as well, in a spring-biased cord reel lacking any latching and unlatching mechanism, such as may be called a "constant-tension" reel.

A primary object of the present invention is provision of a lightweight cord-reel resistant to high-temperature deformation.

Another object of this invention is simplification in construction and assembly of the respective parts of such a reel.

A further object is adaptation of such a reel for payout of the electrical cord in either direction without undue flexing or chafing.

Other objects of this invention, together with means and methods for attaining the various objects, will be apparent from the following description and the accompanying diagrams of a preferred embodiment thereof, which is presented by way of example rather than limitation.

FIG. 1 is a side elevation, partly in section, of a first hub-and-flange member of this invention;

FIG. 2 is a side elevation, partly in section, of a complementary hub-and-flange member;

In general, the objects of the present invention are accomplished, in retractable electrical cord-reel apparatus, by means of a hub-and-flange member having either or both a generally flat face with a plurality of annular recesses therein spaced radially from one another to accomodate annular electrical conductor rings, the intervening face portion having means thereon to retain such rings in place, or/and a back having a cylindrical hub wall portion portion adapted to receive one end of a multiple-conductor electrical cord therein for attachment to the conductor rings via suitable communicating openings through the member.

Figure 3:
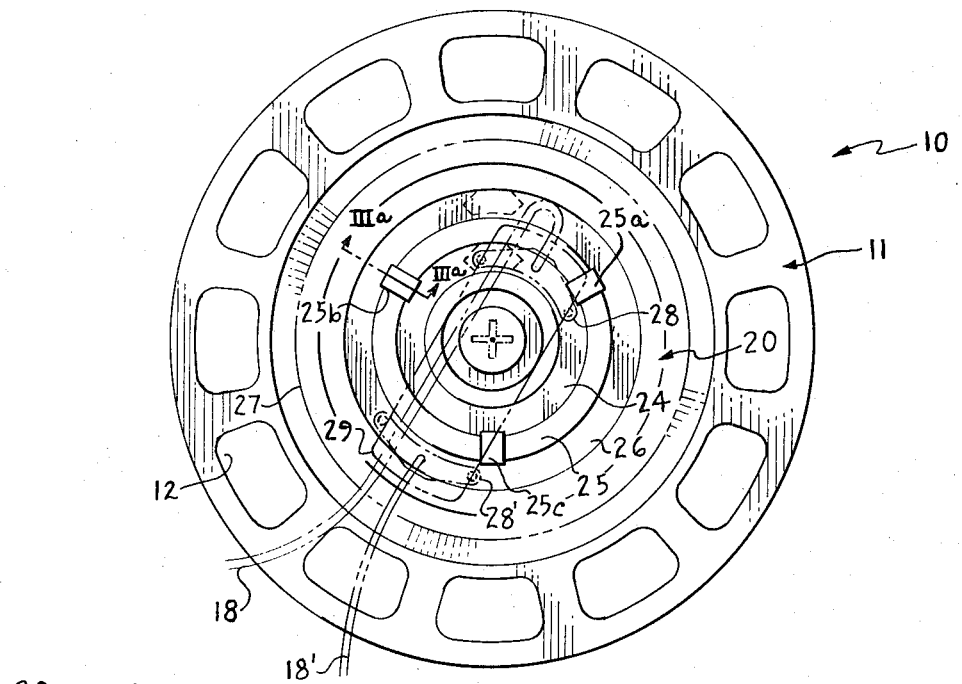
FIG. 3 is a front or outer face elevation of the hub-and-flange member of FIG. 1 with annular electrical conductor rings in place and with a brush block and dust cover superimposed thereon.
Figure 3A:
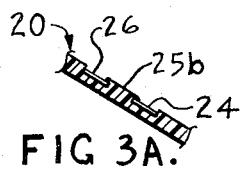
FIG. 3a is a detail sectional view taken at IIIa—IIIa on FIG. 3.
Figure 4:
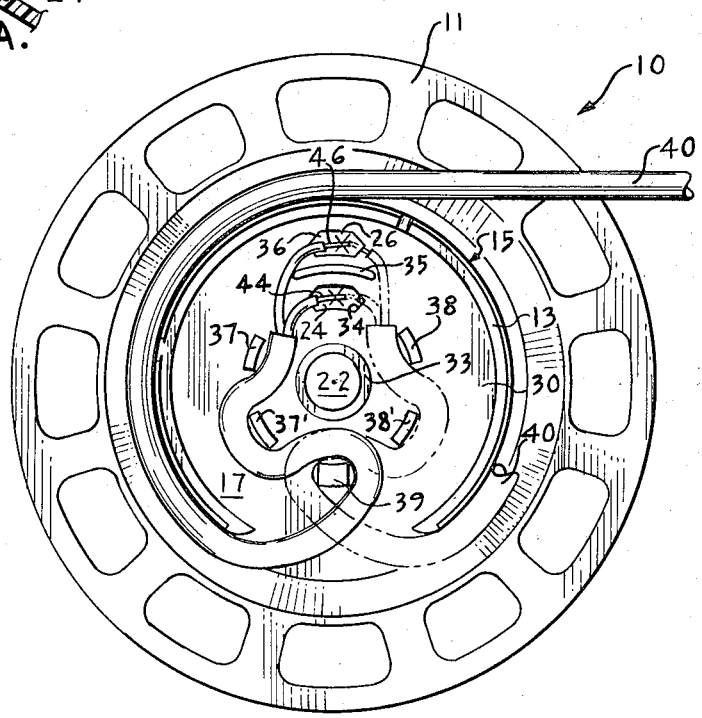
FIG. 4 is a rear or inner face elevation of the hub-and-flange member of FIG. 3 with the electrical cord in place.

FIGS. 1, 3, and 4 show in side elevation (partly in section) and in front and rear elevation, respectively, hub-and-flange member 10 of this invention. Flange portion 11 has evenly spaced openings 12 therein and joins hub portion 15, which has cylindrical wall 16 extending to the rear and interrupted by gap 17 therein. Front or outer face 20 of member 10 is slightly dished relative to the flange portion but for most purposes may be regarded as generally flat except for central bore 22 therein and pair of concentric annular recesses 14 and 16 accommodating electrical conductor rings 24 and 26, respectively located nearer to and further from the bore. Intervening face portion 25 is raised in several V-shaped protrusions 25a, 25b, and 25c (one visible in FIG. 1) to constitute retaining means for the rings upon being upset over the edges thereof by cold-forming so as to stake the rings in place (FIG. 3a). Shown superimposed thereon (FIG. 3) are electrically insulating protective "dust" cover 27 together with brush block 29 above the cover and pairs 28 and 28' of brush contacts located beneath the cover so as to ride on the respective rings. The brush block, which carries the brush contacts and the cover, also carries pair of leads 18, 18' connected to the brushes and is itself carried by arbor 32 and reel-supporting bracket 80 (FIG. 5).

Rear or inner face 30 (FIG. 4) of hub-and-flange member 10 has arbor collar 33 in the center. Located around the collar but spaced therefrom and from surrounding cylindrical wall 13 of hub portion 15 are a half dozen upstanding bosses. Thin arcuate boss 35 is located between openings 34 and 36 through which respective annular conductor rings 24 and 26 are visible. Diametrically opposite thereto is boss 39, and a diameter (not shown) therethrough bisects gap 17 in the wall. Between these two bosses and substantially equidistant from the axis are pair of intermediate bosses 37, 37' on the left side and like pair 38, 38' on the right side of the axis. Terminals 44 and 46 of electrical cord 40 are attached (as by spot-welding) to respective conductor rings 24 and 26 through openings 34 and 36. The cord then passes inside boss 37, outside boss 37', inside boss 30, and through a gap in wall 13 to wrap essentially tangentially onto and clockwise around the hub. Shown in broken lines is alternative threading of the cord (about bosses 38, 38', and 39) for counter-clockwise wrapping around the hub. Such securing of the cord to eliminate all or most of the force at the cord terminals when the cord is pulled to pay it out from the reel is known as "strain relief".

The edge of wall 13 on hub portion 15 of hub-and-flange member 10 is stepped to fit with the oppositely stepped edge of wall 53 on hub portion 55 of complementary hub-and-flange member 50 (FIG. 2). Flange portion 51 has openings 52 therein similar to openings 12 in flange portion 11 of hub-and-flange member 10. The respective edges are keyed and slotted to fit nonrotatively relative to one another. Thus, key 48 on hub wall 13 fits into slot 58 in hub wall 53, and key 59 on hub wall 53 fits into slot 19 in hub wall 13. Slot 58 is enlarged inwardly of the wall edge to receive double-headed rivet 62, which retains outer end 61 of ribbon-like helical spring 65, while inner end 69 thereof is secured to arbor 70 by fitting within slot 72 therein (FIG. 5). Further details of latter hub-and-flange member 50, whose cylindrical hub portion is open to the outside (rather than to the inside, as is that of cooperating member 10) appear in aforementioned Pat. No. 3,542,172.

Figure 5:
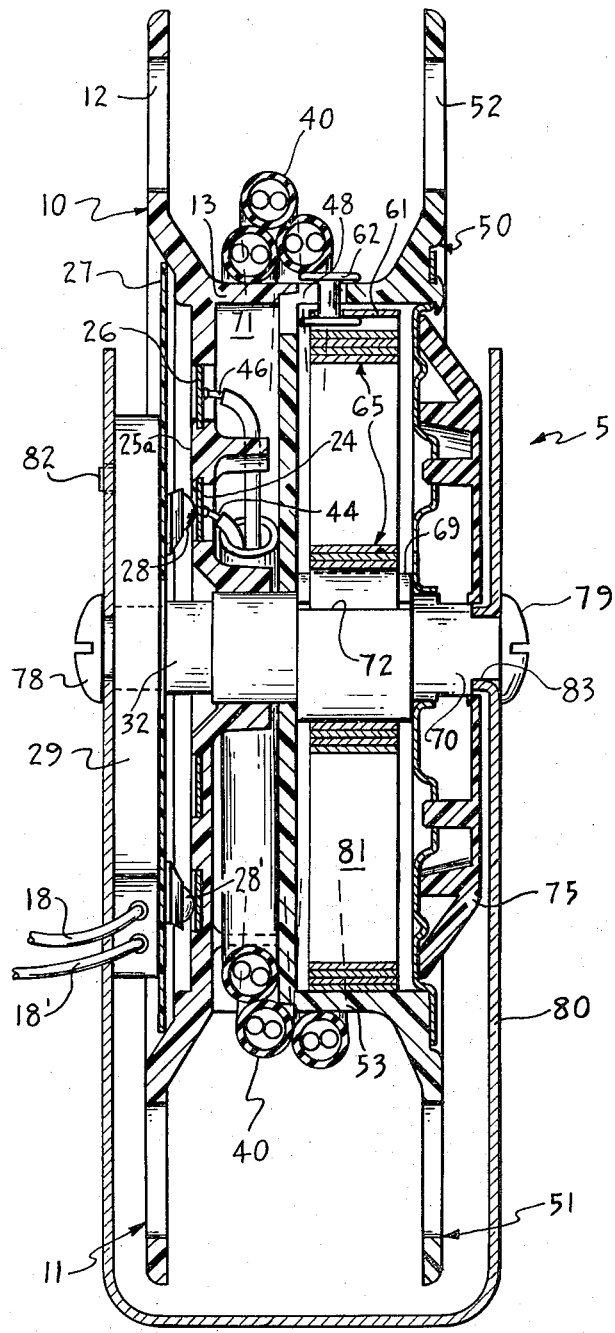
FIG. 5 is an axial section, on an enlarged scale, of a cord-reel assembled from the foregoing members and related components.

FIG. 5 shows cord-reel apparatus 5 made up of hub-and-flange members 10 and 50 assembled on arbor 70 and secured together at the juxtaposed complementarily stepped edges of the respective hub portions. It is apparent that in this assembly two compartments are formed: cord compartment 71 and spring compartment 81, enclosing electrical cord 40 and helical spring 65 within the hub portions of the respective members. Also included are external components such as brush block 29 and dust cover 27 superimposed on the outer face of member 10, housing 75 (for latching and unlatching mechanism when used) superimposed over and closing the open outer end of the hub portion of member 50, and support bracket 80 secured by screws 78 and 79 toopposite ends of the arbor and keyed thereto by inward flanging 83 at the right end and to the brush block by key 82 outwardly protruding therefrom into a suitable hole in the upper part of the bracket at the left side.

Cord compartment 71 contains only one end of the cord and its conductor terminals, while the rest of the cord, except for the opposite end portion, is wrapped around the hub (made up of respective hub portions 15 and 55, identified in preceding views) flanked by respective flange portions 11 and 51. The cord may be withdrawn therefrom, by manual or other pulling of the non-illustrated end thereof, thereby rotating the reel against the bias of helical spring 65. In spring compartment 81, when most of the cord is on the reel, most of the spring lies relatively unwound against the inside of the hub wall, and when most of the cord is unwound therefrom, most of the spring is wound closely about arbor 70. Electrical continuity is maintained through the reel, from the external end of cord 40 through terminals 44, 46 and attached conductor rings 24, 26 and brush contacts 28, 28' contiguous therewith to interconnecting leads 18, 18'. Either such lead may be connected to a power source and the opposite lead to a suitable electrical load. If desired, the electrical brushes and rings could be interchanged, to locate the brushes on the face of the hub-and-flange member and the annular rings on the overlying block (suitably enlarged).

It will be understood that, even when the cord is fully unwound from the reel, the cord portion entering gap 17 in the hub wall does not flex through more than a right angle; this restricted angular change reduces the wear thereon, regardless of which direction the cord is wound about the reel. Of course, the direction of winding is determined by the spring bias direction, and reverse installation of the spring is essential to reverse winding of the cord. With this construction of cord-reel such cord reversal is readily accomplished during assembly.

The hub-and-flange members are preferably composed of a lighweight, heat-resistant, electrically insulating synthetic resin. Polycarbonates (polyesters of bisphenol A and carbonic acid) are useful compositions for the hub-and-flange members. A suitable polycarbonate is available from General Electric Company under the brand name "Norel". A reel so composed is lighter in weight than a similar reel of the prior art composed of polystyrene but with an insert made of phenol-formaldehyde resin to secure the cord and carry the conductor rings. The respective hub-and-flange members are readily formed in a conventional molding operation and are bonded together either by solvent (e.g., trichloroethylene) action, ultrasonic welding, or dielectric heating when juxtaposed as shown. Polysulfones have similar characteristics and may be used instead.

Formation of strain-relief bosses integrally with a conductor-carrying hub-and-flange member eliminates the necessity of such a separate strain-relief insert or block to retain the cord and renders it unnecessary to support electrical conductor members on such an insert or on another separate block. Spacing of such bosses, as illustrated, accommodates cord of a wide range of diameters and cross-sectional configurations, which in previous reels required diverse formations of inserts, blocks, or like members, often with helical passageways of critical dimensions. Other advantages of this reel construction will accrue to the benefit of those undertaking to use it.

Although a preferred embodiment of the present invention has been shown and described herein, some permissible variations have been suggested. Other modifications may be made therein, as by adding, combining, or subdividing parts, or substituting equivalent parts, while retaining substantial advantages of the invention, which itself is defined in the following claims.

We claim:

1. In retractable electrical cord-reel apparatus, the improvement comprising a unitary hub-and-flange member having a generally flat face with a plurality of annular recesses therein spaced radially from one another to accomodate annular electrical conductor rings, the intervening face portion having means thereon to retain such rings in place, wherein the intervening face portion is raised at intervals alongside the recesses and adapted to be upset laterally to overlie the edges of such rings therein and thereby retain the rings in place.

2. In retractable electrical cord-reel apparatus, the improvement comprising a unitary hub-and-flange member having a generally flat face with a plurality of annular recesses therein spaced radially from one another to accommodate tabless annular electrical conductor rings such rings positioned therein, the intervening face portion having means thereon to retain such rings in place.

3. Cord-reel apparatus according to claim 2, wherein each recess communicates with the back of the hub-and-flange member via an intervening opening therethrough.

4. Cord-reel apparatus according to claim 3, wherein the back of the hub portion includes a cylindrical wall portion adapted to receive one end of a multiple-conductor electrical cord therein for attachment to the conductor rings through the communicating openings.

5. Cord-reel apparatus according to claim 4, wherein the cylindrical hub wall portion has a gap therein to accommodate the electrical cord for essentially tangential exit therethrough, and the back of the hub portion includes a plurality of axially opposed bosses spaced to accommodate the cord in serpentine configuration thereabout, in alternative clockwise and counterclockwise configuration from the ring openings to the wall gap.

6. In retractable electrical cord-reel apparatus, the improvement comprising a hub-and-flange member having on the back thereof a cylindrical hub wall portion adapted to receive one end of a multiple-conductor electrical cord therein and to retain the cord frictionally against longitudinal removal therefrom, wherein the cylindrical hub wall portion has a gap therein to accommodate the electrical cord for essentially tangential exit therefrom, and wherein the back of the hub portion includes a plurality of bosses spaced to accommodate the electrical cord in serpentine configuration thereabout, in alternative clockwise and counterclockwise configuration, to the wall gap from a location on the opposite side of the reel axis.

7. Cord-reel apparatus according to claim 6, including a first such boss between the axis and the gap and including also a plurality of such bosses at each side of the axis, the bosses on either side and the first boss accommodating one direction of cord configuration and retaining the cord frictionally against lengthwise withdrawal through the gap.

8. Cord-reel apparatus according to claim 6, wherein the member has a plurality of openings therethrough at such opposite location for communication between the back and the face of the reel.

9. Cord-reel apparatus according to claim 8, including a plurality of annular electrical conductor rings carried on the face of the member and respectively overlying such openings for attachment to the ends of the respective electrical conductors of the cord.

10. Retractable electrical cord-reel apparatus comprising an arbor, a pair of hub-and-flange reel members supported rotatably thereon and secured together in sheave-like configuration to accommodate an electrical cord wrapped therearound and having a pair of conductors terminating within the hub after passage of the cord through a gap in a cylindrical hub wall portion of one of the reel members, a pair of ringlike electrical conductors supported on the face of that one of the reel members and communicating by way of a pair of openings therethrough with the ends of the electrical conductors therewithin, a pair of electrical brush contacts contiguous with the respective ringlike conductors for interconnection with an external circuit and supported for rotation relative to the reel, a helical spring motor within a cylindrical hub wall portion of the other of the reel members and attached at its opposite ends to the arbor and the hub wall, and bracket means for stationary support of the arbor and the brush contacts, wherein the hub portion of the first hub-and-flange member is open toward the other hub-and-flange member, whose hub portion is closed relative thereto but open toward the latching and unlatching mechanism.

11. Cord-reel mechanism according to claim 10, wherein the electrical cord is retained frictionally against longitudinal withdrawal from the reel hub by a plurality of bosses upstanding on the back of the first hub-and-flange member and accommodating the cord in serpentine configuration thereabout.

12. In retractable electrical cord-reel apparatus, wherein a hub member is flanked by a pair of flanges to accommodate an electrical cord wrapped about the hub and retained between the flanges, the improvement comprising a unitary member including a hub portion and a flange portion extending therefrom, having one face configured to accommodate and to retain a plurality of spaced electrically conducting members in contact therewith having the opposite face configured to accommodate an electrical cord for terminal interconnection with the spaced electrically conducting members.

13. Cord-reel apparatus according to claim 12, wherein the opposite face has strain-relief means accommodating the cord for substantially tangential pay-out in either clockwise or counter-clockwise direction.

14. Cord-reel apparatus according to claim 12, wherein the unitary hub-and-flange member is composed of a polycarbonate.

15. Cord-reel apparatus according to claim 14, including also a complementary hub-and-flange member of like composition bonded thereto with the respective hub portions in coaxial juxtaposition.

16. Cord-reel apparatus according to claim 15, wherein the component hub-and-flange member are molded articles and are bonded together by ultrasonic welding.

17. In combination, in a unitary cord-reel member having a hub portion and a flange portion extending therefrom, a face thereof configured to accommodate a plurality of spaced electrically conductive members thereon and an opposite face thereof configured with cylindrical bosses thereon to provide strain-relief for electrical cord of various sizes and optional clockwise or counter-clockwise tangential cord pay-out from the hub portion thereof.

18. For use in an electrical cord-reel, the improvement comprising a unitary reel member according to claim 17, wherein the hub portion comprising substantially half of the full width of a hub of such cord-reel, and the flange portion comprises one of two flanges of such reel.

19. An electrical cord-reel comprising a unitary reel member according to claim 17 in conjunction with a complementary hub portion and a similar flange portion secured thereto and thereby spaced from the first flange portion.

20. A unitary cord-reel member according to claim 17, wherein the configuration of the first face to accommodate the plurality of electrically conductive members comprises a plurality of spaced annular recesses therein.

* * * * *